Patented July 16, 1946

2,404,100

UNITED STATES PATENT OFFICE 2,404,100

AKYLATION OF NAPHTHENES

Louis Schmerling, Riverside, Ill., assignor to Universal Oil Products Company, Chicago, Ill., a corporation of Delaware No Drawing. Application November 16, 1942, Serial No. 465,693

11 Claims. (Cl. 260—666)

1

This invention relates to the treatment of cyclic saturated hydrocarbons to produce high molecular weight alkyl derivatives thereof. More specifically, the process is concerned with a method of reacting naphthenes with an alkylating agent in the presence of a novel and convenient catalyst to produce valuable alkylated cyclic hydrocarbons.

In one specific embodiment the present invention comprises a process for alkylating naphthenic hydrocarbons with olefinic hydrocarbons in the presence of a solution formed by adding aluminum chloride to a nitroparaffin.

Olefinic hydrocarbons utilizable as alkylating agents may be either normally gaseous or normally liquid and comprise ethylene, propylene, butylenes, and the normally liquid olefins including polymers of lower boiling olefins. Diolefins, other poly olefins, and cyclic olefins may also be made to react with naphthenic hydrocarbons but generally under different conditions of operation from those employed in the alkylation of naphthenes with the aliphatic and mono olefins. These olefinic reactants may be obtained from any convenient source, for example, from the catalytic or thermal conversion of hydrocarbon oils. It is also possible to employ hydrocarbon mixtures which contain paraffins and naphthenes as well as olefins.

Although olefinic hydrocarbons are the preferred alkylating agents of the present invention, it is by no means intended to limit the scope of the process to olefins. Various other alkylating agents such as alcohols, ethers, esters, or alkyl halides all of which may be considered as "olefin producing" or "olefin acting" substances may be employed as alkylating agents under appropriate operating conditions. However, the use of these latter compounds as alkylating agents should not be considered on an equivalent basis with the use of olefinic reactants since somewhat different operating conditions may be necessary depending upon the particular reactants being used, the nature of the catalyst, and upon other factors.

The term naphthenes is intended to include hydrogenated aromatics and cycloparaffins or alkyl cycloparaffins generally, particularly those having 5, 6, or 7 carbon atoms in the ring. The lower cycloparaffins having 3 and 4 methylene groups in the ring may also be used although these hydrocarbons are not to be considered on an equivalent basis with the higher naphthenes having 5, 6, or 7 membered rings. Reaction of the 3 and 4 membered ring compounds usually results in scission of the ring. Naphthenic hydrocarbons are available in various straight-run gasolines and naphtha fractions or they may be obtained as reaction products from certain hydrocarbon conversion processes, for example, the catalytic cyclization of aliphatic hydrocarbons.

Suitable catalysts for use in the process of the present invention comprise solutions formed by adding an aluminum halide such as aluminum chloride and aluminum bromide, or mixtures thereof, to a nitroparaffin such as nitromethane, nitroethane, a nitropropane, or a nitroparaffin of higher molecular weight. The different nitroparaffins which may thus be used to form catalysts for the present process are not necessarily equivalent since some nitroparaffins are more suitable than others for producing catalyst solutions of high activity. The particular nitroparaffin chosen to be added to the aluminum halide is also dependent upon the nature and proportions of the hydrocarbons being reacted, the conditions of operation, and other factors.

At about 20° C. the lower members of the nitroparaffin series, including nitromethane, nitroethane, and the nitropropanes dissolve as much as an equal weight of aluminum chloride and produce a homogeneous liquid which may be readily contacted with hydrocarbons being subjected to alkylation.

When aluminum chloride in the form of a solid is used for catalyzing the alkylation of hydrocarbons, such as naphthenes, the formation of sludge-like material upon the surface of the aluminum chloride decreases its catalytic activity and ordinarily makes it necessary to withdraw the sludge-like material and add fresh aluminum chloride periodically in order to proceed with the alkylation. When alkylating in the presence of a catalyst formed by adding aluminum chloride to a nitroparaffin, the catalyst is substantially in the form of a liquid mixture or solution which is contacted readily with the reacting naphthenes and alkylating agents. Thus relatively high speeds of alkylation are obtained with a given quantity of aluminum chloride because substantially all of the aluminum chloride thus introduced into the reaction mixture is available for catalyzing the reaction, a condition entirely different from that obtained when using solid particles of aluminum chloride where only the aluminum chloride on the surface of the particles can be contacted with the reacting hydrocarbons.

The catalysts of the present invention have a particular advantage in the alkylation of naphthenes with alkyl halides as the alkylating agents, It is well-known that no alkylation ordinarily occurs when an alkyl halide and a naphthene are contacted with aluminum chloride alone, e. g., see Nenitzescu and Ionescu, Ann. 491, 189 (1931). Instead, a reaction takes place which may be called "intermolecular hydrogenation" in which the alkyl halide is converted to a paraffin and the naphthene is converted to unsaturated products which go to form a sludge or so-called "lower layer." Under some conditions two molecules of the naphthene are condensed to form bi-naphthenyl compounds. In the presence of the catalysts of the present invention, however, such hydrogen disproportionation does not occur and the product obtained is a true alkylation product formed by the interaction of a molecule of naphthene with one or more molecules of the alkyl halide.

The alkylation of naphthenic hydrocarbons by olefinic hydrocarbons or other alkylating agent is carried out in the presence of solutions formed by adding aluminum chloride to nitroparaffins at a temperature of from about 0° C. to about 100° C., preferably from about 20° C. to about 80° C., and under a pressure of from substantially atmospheric to approximately 100 atmospheres or more. In the hydrocarbon mixture subjected to alkylation it is preferable to have present from about 2 to about 40 molecular proportions of naphthenic hydrocarbons per molecular proportion of olefinic hydrocarbons added as alkylating agent. In general a higher molecular proportion of naphthene to olefin is employed when a normally liquid olefinic hydrocarbon is used because of the fact that the higher molecular weight olefins, particularly those boiling higher than pentenes, generally undergo depolymerization prior to or simultaneously with alkylation. A relatively small quantity of hydrogen chloride is preferably added to the reaction mixture generally to the extent of from about 0.1 to about 5% by weight of the total hydrocarbon mixture. It is frequently also desirable to have hydrogen present in the reaction mixture generally in a quantity of not more than about 10 mol per cent of the total hydrocarbons present.

The alkylation of naphthenes may be carried out using either batch or continuous operation. Thus, in batch type operation the catalyst solution is charged to a reactor containing a naphthene, and the reaction mixture is then agitated while an olefinic hydrocarbon or a hydrocarbon fraction containing olefins is added thereto preferably together with relatively small amounts of hydrogen chloride to effect formation of higher boiling alkylated naphthenes. The resulting product may be permitted to settle into two layers and may then be separated into an upper hydrocarbon layer containing the alkylate and unconverted reactants and a lower layer of catalyst. The used catalyst and unconverted naphthenes, the latter being separated from the alkylate by distillation, are returned to the autoclave for further use in a subsequent alkylation treatment. Some of the nitroparaffin solvent which is slightly soluble in the alkylation products may also be separated therefrom by fractional distillation in a relatively narrow fraction boiling in the range of the nitroparaffin employed, by extraction with alkali, or by hydrolysis with a mineral acid.

The continuous type of alkylation treatment is carried out by introducing the olefinic hydrocarbon or a hydrocarbon fraction containing olefins to a circulating commingled mixture of a naphthene and the aluminum chloride-nitroparaffin catalyst. The mixture of hydrocarbons and catalyst is passed through a tortuous path in some type of baffled mixer or reactor containing a packing material to effect intimate contact of the catalyst solution with the reacting hydrocarbons preferably in the presence of hydrogen chloride. The conditions of temperature and pressure employed in such an alkylation treatment are within the indicated limits but the particular conditions used in any particular alkylation may vary with the molecular weights and reactivities of the hydrocarbons reacted, the concentration and activity of the catalyst solution employed, and other factors.

It is generally advantageous to introduce the olefin-containing mixture at a plurality of points throughout the reaction zone rather than to commingle all of the olefinic hydrocarbon with the naphthenic hydrocarbon prior to introduction to the catalytic alkylation zone. In this way a relatively high ratio of naphthenes to olefins is readily maintained, alkylation is thereby favored, and polymerization of olefin is kept relatively low. The reaction mixture obtained from such a continuous treatment is then conducted to a separating zone in which the hydrocarbon material separates as an upper layer from the heavier catalyst layer which may be withdrawn and recycled to further use. The upper hydrocarbon layer which is thus separated from the aluminum chloride-nitroparaffin catalyst is fractionally distilled to separate unconverted naphthenes and hydrogen chloride from the desired alkylation products. The recovered mixture of unconverted naphthenes and hydrogen chloride is recycled to further treatment in the alkylation zone of the process.

The following examples are given to illustrate the nature of the results which may be obtained by the use of the present process although the data presented are not introduced with the intention of unduly restricting the generally broad scope of the invention.

*Example I*

A catalyst solution was prepared by adding 20 parts by weight of aluminum chloride to 40 parts by weight of nitromethane which resulted in a clear yellow solution. This catalyst was charged to a nickel lined stirring autoclave along with 150 parts by weight of cyclohexane and 3.5 parts by weight of hydrogen chloride. Over a period of four hours, 40 parts by weight of propylene was added to the autoclave which was maintained at approximately 62° C. and a pressure of from about 20 to about 35 pounds per square inch. Stirring was continued for two hours after all the propylene had been added. When the liquid products were analyzed an appreciable yield of propyl cyclohexane or an isomer thereof was isolated.

*Example II*

A catalyst solution was prepared by mixing 10 parts by weight of aluminum chloride with 15 parts by weight of nitromethane. This solution was charged to a glass lined rotating autoclave along with 80 parts by weight of cyclohexane and 45 parts by weight of tertiary butyl chloride. The autoclave was pressured initially with nitrogen to about 30 atmospheres. Stirring was started and the reaction was allowed to proceed at 70° C. for about four hours.

The reaction products were washed with alkali and water and then distilled. The presence of substantial amounts of butyl cyclohexane or isomers thereof was determined by the isolation of a fraction boiling within the range of 150–175° C. and having a refractive index of 1.4369. A small amount of chlorocyclohexane was also detected.

Example III

A catalyst solution prepared as in Example I was contacted with 150 parts by weight of methyl cyclohexane and 3.7 parts by weight of hydrogen chloride. Over a period of about three hours, 45 parts by weight of propylene was added to the reaction zone with continuous stirring at about 64° C. and a pressure of from about 20 to about 35 pounds per square inch.

When the products were distilled a yield of about 11% of the theoretical of methyl propyl cyclohexane or isomers thereof was found.

Example IV

About 94 parts by weight of methyl cyclohexane was alkylated with 40 parts by weight of isopropyl chloride in the presence of a catalyst solution prepared as described in Example II. The reaction was conducted in a glass lined rotating autoclave at 70° C. under an initial nitrogen pressure of 30 atmospheres and for a period of about four hours. A substantial yield of methyl propyl cyclohexane or an isomer thereof was isolated in the form of a fraction boiling from about 164–175° C. and having a refractive index of 1.4420.

Using the same procedure and a catalyst prepared in the same manner 67 parts by weight of methyl cyclohexane was reacted with 30 parts by weight of tertiary butyl chloride under the same operating conditions. A distillation of the liquid hydrocarbon reaction products indicated the formation of a substantial amount of methyl tertiary butyl cyclohexane or isomers thereof in the form of a fraction boiling from 160–180° C. and having a refractive index of 1.4301.

I claim as my invention:

1. A process for synthesizing hydrocarbons which comprises reacting a naphthenic hydrocarbon with an alkyl halide at a temperature of from about 0 to about 100° C. in the presence of a catalyst formed by adding an aluminum halide to a nitroparaffin.

2. A process for synthesizing hydrocarbons which comprises reacting a naphthenic hydrocarbon with a alkyl halide at a temperature of from about 20 to about 80° C. in the presence of a catalyst formed by adding aluminum halide to a nitroparaffin.

3. A process for synthesizing hydrocarbons which comprises reacting a naphthenic hydrocarbon with an alkyl halide at a temperature of from about 0 to about 100° C., at a pressure of from about 1 to about 100 atmospheres, in the presence of a catalyst formed by adding an aluminum halide to a nitroparaffin, and in the presence of a substantial molecular excess of the naphthenic hydrocarbon over the alkylating agent.

4. A process for syntheisizing hydrocarbons which comprises reacting a naphthenic hydrocarbon with an alkyl halide under alkylating conditions in the presence of a catalyst formed by adding an aluminum halide to a nitroparaffin.

5. The process of claim 4 wherein said reaction is conducted in the presence of hydrogen chloride.

6. The process of claim 4 wherein said reaction is conducted in the presence of hydrogen.

7. The process of claim 4 wherein said reaction is conducted in the presence of hydrogen chloride and hydrogen.

8. The process of claim 4 where said aluminum halide comprises aluminum chloride.

9. The process of claim 4 wherein said catalyst is formed by adding aluminum chloride to nitromethane.

10. A process for the synthesis of hydrocarbons which comprises reacting cyclohexane with an alkyl halide under alkylating conditions in the presence of catalyst formed by adding aluminum chloride to a nitroparaffin.

11. A process for the synthesis of hydrocarbons which comprises reacting methyl cyclohexane with an alkyl halide under alkylating conditions in the presence of catalyst formed by adding aluminum chloride to a nitroparaffin.

LOUIS SCHMERLING.